(12) United States Patent
Oura et al.

(10) Patent No.: US 6,485,209 B2
(45) Date of Patent: Nov. 26, 2002

(54) KEYBOARD DEVICE CAPABLE OF CHANGING INCLINATION ANGLE OF KEYBOARD MAIN BODY

(75) Inventors: Nobuhiro Oura, Fukushima-ken (JP); Akio Nishijima, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/814,437

(22) Filed: Mar. 22, 2001

(65) Prior Publication Data

US 2001/0028820 A1 Oct. 11, 2001

(30) Foreign Application Priority Data

Apr. 6, 2000 (JP) ........................................ 2000-104376

(51) Int. Cl.[7] ................................................ B41J 11/56
(52) U.S. Cl. ........................ 400/681; 400/472; 400/691; 248/688
(58) Field of Search ................................ 400/472, 681, 400/682, 691, 693; 361/680; 108/1; 248/188, 188.2, 396, 397, 649, 677, 685, 688

(56) References Cited

U.S. PATENT DOCUMENTS

| 4,402,624 A | * | 9/1983 | Stahl et al. ..................... 108/7 |
| 4,735,394 A | * | 4/1988 | Facco ............................ 108/7 |
| 5,297,003 A | * | 3/1994 | Nomura et al. ............. 108/133 |
| 5,347,424 A | * | 9/1994 | Akahane ...................... 108/117 |
| 5,469,327 A | * | 11/1995 | Cheng ............................ 108/1 |
| 5,732,928 A | * | 3/1998 | Chang ........................ 248/456 |
| 6,097,592 A | * | 8/2000 | Seo et al. .................... 248/351 |

FOREIGN PATENT DOCUMENTS

| EP | 216274 | 8/1990 |
| JP | 2755824 | 3/1998 |

* cited by examiner

Primary Examiner—Ren Yan
(74) Attorney, Agent, or Firm—Brinks Hofer Gilson & Lione

(57) ABSTRACT

In order to perform a stable key inputting operation even if the keyboard device is installed at an inclined surface, a rear surface of a main body is formed with a notch, and the notch is provided with an adjuster member. A turning centerline of the adjuster member is in an inclined angle in respect to the rear surface. The notch has a depth size from the rear surface at the rotatable supporting side of the adjuster member deeper and its depth size becomes smaller as it is farther from the rotatable supporting side. The adjuster member is turned to cause the adjuster member to be changed over between one attitude in which it is protruded out of the notch and the other attitude in which it is stored in the notch. In addition, the adjuster member is formed with a shaft, there is provided a resilient member for resiliently pressing the outer circumference of the shaft and the resilient member is fitted to a sliding notch formed at the outer circumference of the shaft.

9 Claims, 7 Drawing Sheets

KEYBOARD DEVICE CAPABLE OF CHANGING INCLINATION ANGLE OF KEYBOARD MAIN BODY

BACKGROUND OF THE INVENTION

1. Field of the Invention

This invention relates to a keyboard device capable of changing an inclination angle of a main body and optimizing the touch at a key when a key touch operation is performed.

2. Description of the Related Art

FIG. 12 is a perspective view for showing a part at a rear side of a prior art keyboard device 50.

This keyboard device 50 is constituted of a main body 51 and an adjuster member 52. Rectangular box-shaped notches 53 are formed at both longitudinal ends (only one end is shown in the figure) of the rear surface of the main body 51, and the adjuster member 52 is stored in the notch 53. The adjuster member 52 is formed with a shaft 52a extending in a longitudinal direction of the main body 51 at one end thereof. The shaft 52a is further formed with supporting protrusions 52b, 52b axially protruded, wherein the supporting protrusions 52b, 52b are inserted into two bearing holes (not shown) at positions within the notch 53 to which the shaft 52a oppositely faces and pivotally supported there.

With the above arrangement, an inclination angle of the main body 51 can be adjusted. When it is not needed to increase the inclination angle of the main body 51, the adjuster member 52 is stored in the notch 53 so as not to be projected out of the bottom surface 51a. In addition, when the inclination angle of the main body 51 is increased, the adjuster member 52 is turned out of the notch 53 around a fulcrum point of the shaft 52a, thereby it is protruded out of the rear surface 51a and then the adjuster member 52 is raised as shown by a dotted line in FIG. 12.

However, this kind of keyboard device of the prior art indicated by the keyboard device 50 has the following drawbacks.

That is, in the case of the aforesaid keyboard device 50, the adjuster member 52 is turned from the bottom surface 51a of the main body 51 around the horizontal shaft 52a to its raised attitude, so that when the keyboard device 50 is mounted in slant form under a state in which the adjuster member 52 is protruded, there is a possibility that the adjuster member 52 is turned around the shaft 52a by own weight of the keyboard device 50 and by a manual pressing force and the state in which the adjuster member 52 is protruded is not stable.

Further, in the case where the adjuster member 52 is raised up from the bottom surface 51a at the main body 51, it is needed that the free end of the adjuster member 52 is held by fingers and the adjuster member 52 is turned in a direction moving away from the bottom surface 51a. However, in order to perform the aforesaid raising-up operation while bringing the fingers around the rear side of the keyboard device 50, its operation is quite hard to perform and it is quite difficult to set the keyboard device to its inclined attitude.

In addition, the aforesaid keyboard device 50 sometimes shows the case where its inclination angle cannot be changed in a stepwise manner and an operator cannot necessarily operate keys under the most suitable inclination angle.

SUMMARY OF THE INVENTION

The present invention has been invented to solve the aforesaid problems and it is an object of the present invention to provide a keyboard device in which an operator can perform a key operation positively even if a horizontal place cannot be secured, setting of the inclination attitude can be easily attained and the inclination angle can be changed stepwise.

The present invention provides a keyboard device in which an adjuster member arranged at a rear surface of a main body having operation keys at its front surface and installed to be freely protruded from the rear surface is installed and a mounting attitude of the main body is set to a predetermined angle when the adjuster member is protruded, wherein the rear surface of the main body is formed with a notch, the adjuster member is rotatably supported in the notch, the adjuster member can be turned between one attitude in which it is stored in the notch and another attitude in which it is protruded out of the rear surface.

In this case, it is preferable that a turning centerline of the adjuster member is extended from within the notch toward an opening side of the notch at an angle inclined against the rear surface of the main body, one end of the adjuster member in its longitudinal direction is a supporting side rotatably supported and the other end of the adjuster member in its longitudinal direction is a protruding end protruded out of the notch when it is turned, the turning centerline of the turning operation is positioned at the one end side and crossed with a direction extending from the one end to the other end.

Pivot supporting of only one end side composed of the turning centerline with the aforesaid means enables the adjuster member to be changed in two types of attitudes, i.e. one attitude in which the adjuster member is stored in the notch at the time of its turning and the other attitude in which the adjuster member is protruded out of the rear surface of the keyboard device.

In the present invention, it is preferable that the notch is made to have a large depth size measured from the rear surface at a portion where the supporting side of the adjuster member is rotatably supported and its depth size is made to be small as it is spaced apart from the portion where it is rotatably supported, and a thickness size of the adjuster member in a direction to which the turning centerline extends shows a thick size at the supporting side and shows a thin size as it is directed toward the protruding end.

With the aforesaid means, when the adjuster member is placed at an attitude in which it is turned and protruded out of the notch, the protruding end of the adjuster member always becomes the lower-most end and an inclination angle of the main body is changed.

In the present invention, it is preferable that the inner surface of the notch is a concave curved surface including arcs with a plurality of locations on the turning centerline being applied as centers, the side of the adjuster member opposing against the inner surface of the notch is of a shape in which it is slid on the concave curved surface with little clearance during its turning operation, and when the adjuster member is stored in the notch, the side of the adjuster member opposite to the opposing side is of a surface shape where it is positioned on the substantially same location as that of the rear surface.

With the above arrangement, even in the case where the key operation is carried out under an attitude in which the adjuster member is stored in the notch, its stability in operation is not damaged. In addition, it is possible to keep the shape of the notch to a minimum size by forming it into a shape in which the adjuster member slides at the concave curved surface with little clearance, resulting in an arrangement of other members installed inside the main body free from restriction.

In addition, it is preferable in the present invention that there is provided lock means for locking between the main body and the adjuster member under a state in which the protruding end is protruded out of the rear surface. With the above arrangement, it is possible to securely hold the inclination angle of the main body in and to prevent trouble of the key operation while the adjuster member is turned at the time of key operation.

In addition, it is preferable in the present invention that there is provided lock means for locking between the main body and the adjuster member under a state in which the adjuster member is stored in the notch. With the above arrangement, the adjuster member is prevented from freely flown out of the main body in the case where the main body is lifted up, for example.

In addition, the present invention may be provided with lock means for locking between the main body and the adjuster member under a state in which the protruding end is protruded out of the rear surface, a state in which the adjuster member is stored in the notch and an attitude at least in one of the states above.

With the above means, each of the operators performing a key operation can use the keyboard device while inclining it at the most suitable angle. In addition, in the case where two adjuster members are arranged at two locations, that is, both ends of the rear surface of the main body, for example, each of one attitude where one adjuster member protrudes and the other attitude where the other adjuster member protrudes is independently set to enable the main body to be stably mounted even if the space where the main body is installed is not necessarily a horizontal surface, and so a secure key operation becomes possible.

Further, it is preferable in the present invention that the adjuster member is provided with a shaft, bearing holes through which the shaft passes are opened in the notch, the main body is provided a resilient member for resiliently pressing itself against the outer circumference of the shaft under a state in which the shaft is inserted into the bearing holes, the shaft and the resilient member are fitted to each other to form the lock means.

The notch is formed at the outer circumferential surface of the shaft and the resilient member is fitted to the notch, for example, thereby the adjuster member is held at a predetermined position when the adjuster member is turned.

In addition, it is preferable in the present invention that the resilient member resiliently presses the shaft passed through the bearing holes and this resilient member prevents the shaft from being pulled out of the bearing holes.

Additionally, it is preferable in the present invention that the adjuster members are arranged at at least two locations in the rear surface of the main body. For example, in the case where two adjuster members are arranged at two locations, it is preferable that they are installed at both ends of the rear surface of the main body.

DESCRIPTION OF THE PREFERRED EMBODIMENTS

Figure 1:
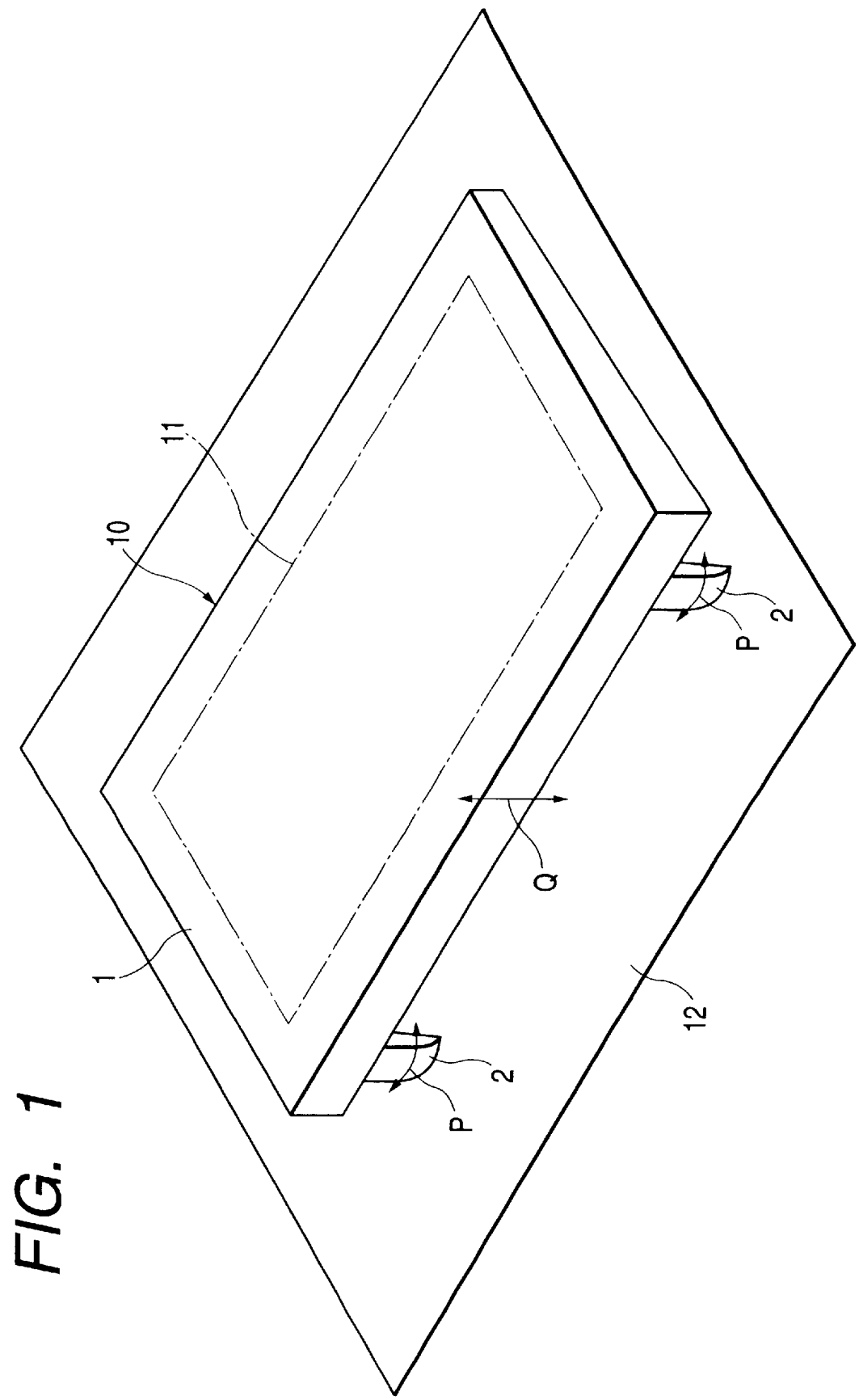
FIG. 1 is a perspective view for showing a state of use of the keyboard device of the present invention.
Figure 2:
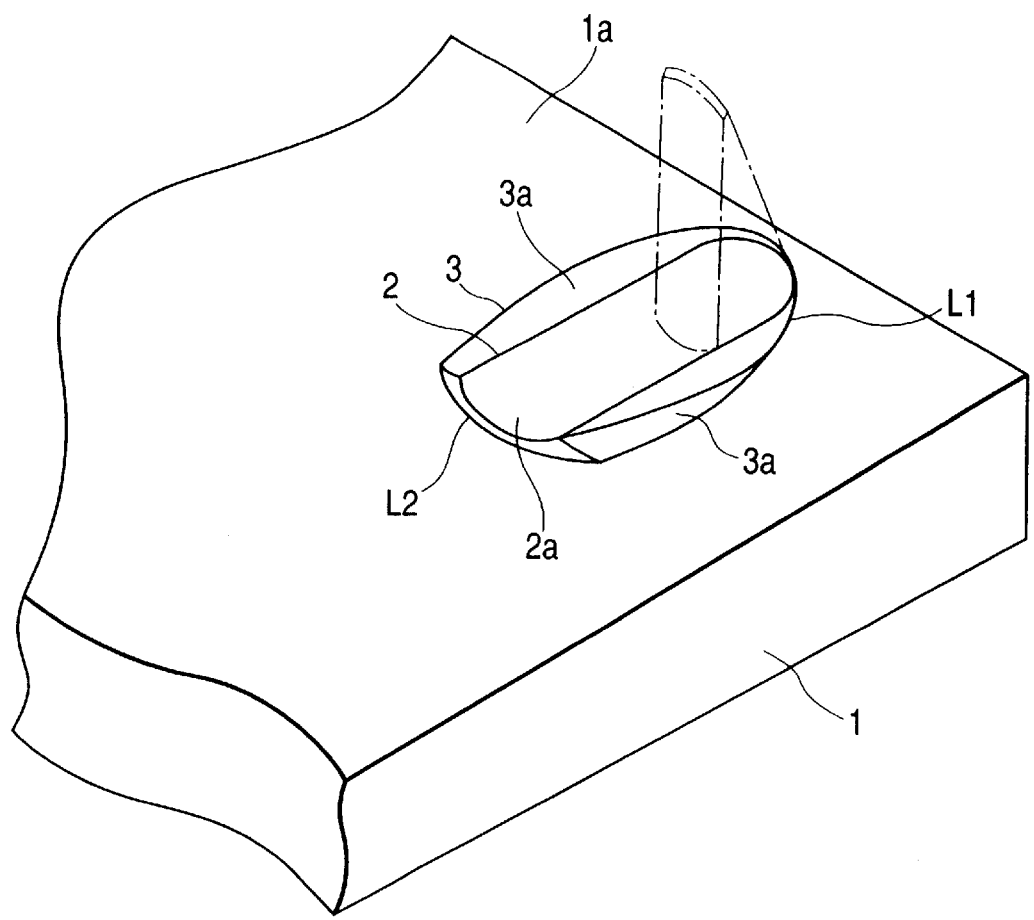
FIG. 2 is a perspective view for showing an adjuster member and its action.
Figure 3:
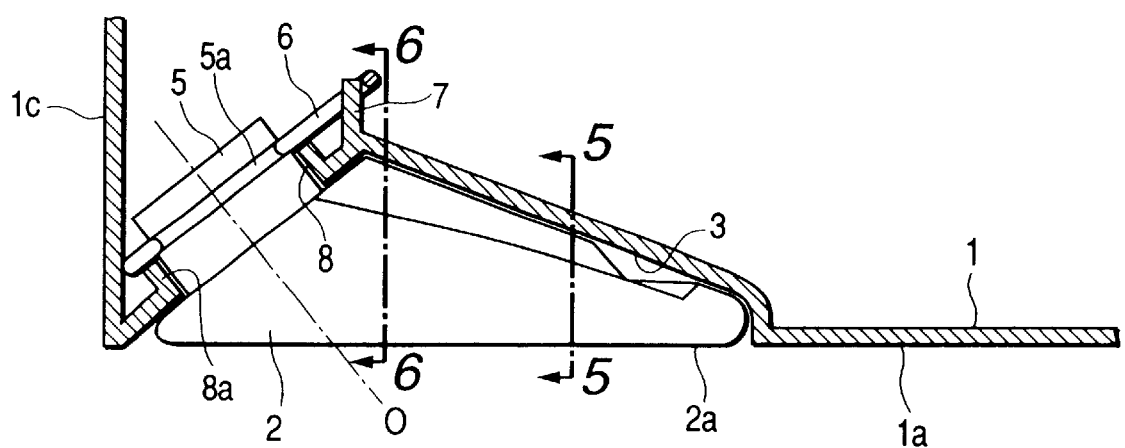
FIG. 3 is a top plan view for showing a storing attitude of the adjuster member.
Figure 4:
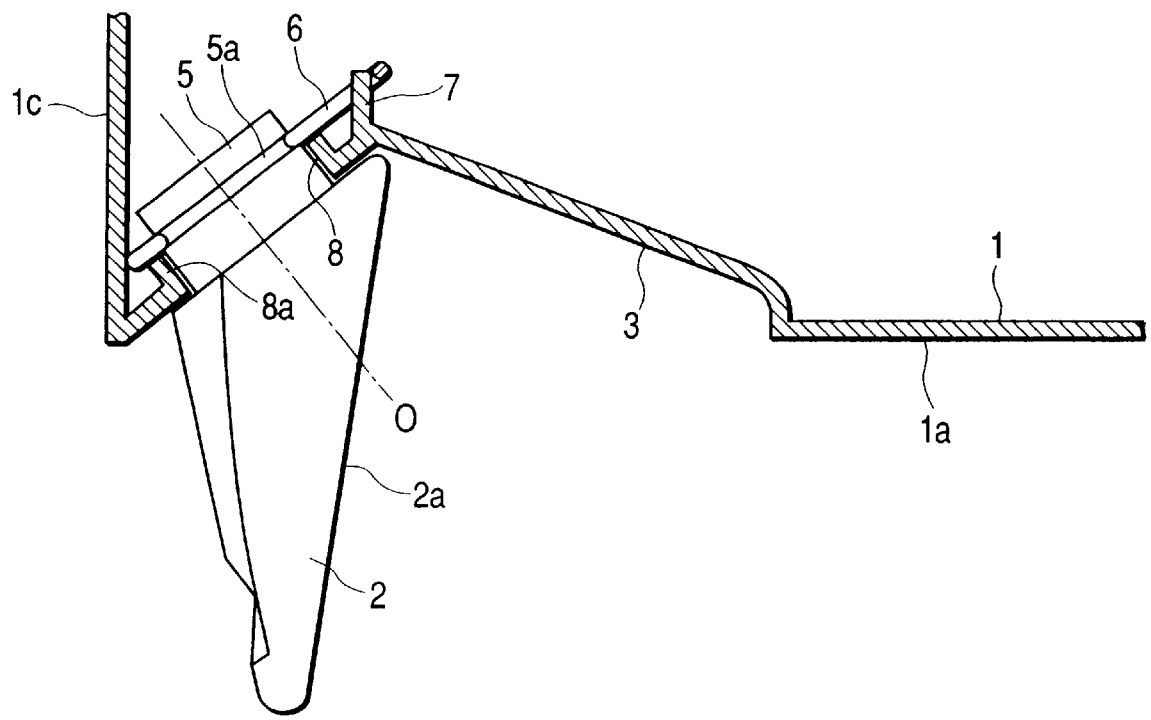
FIG. 4 is a top plan view for showing a protruding attitude of the adjuster member.
Figure 5:
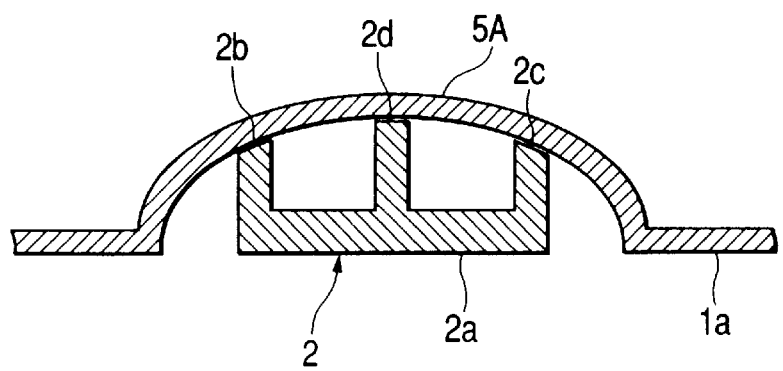
FIG. 5 is a sectional view taken along line 5—5 of FIG. 3.
Figure 6:
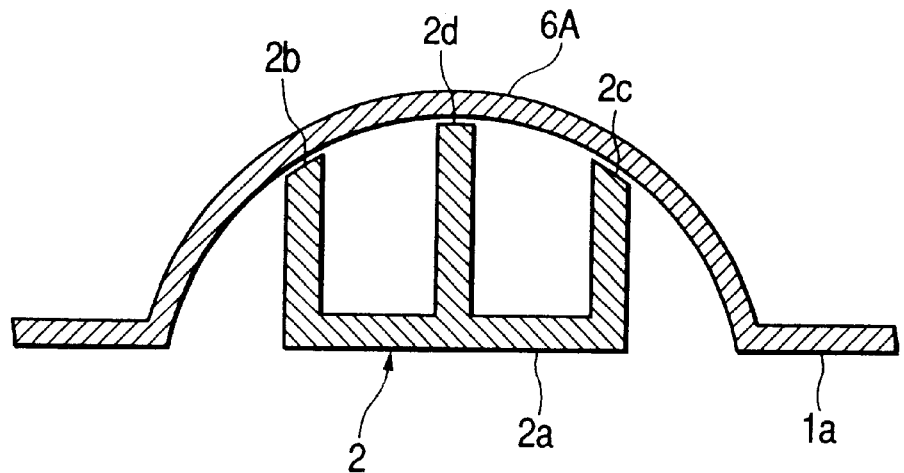
FIG. 6 is a sectional view taken along line 6—6 of FIG. 3.
Figure 7:
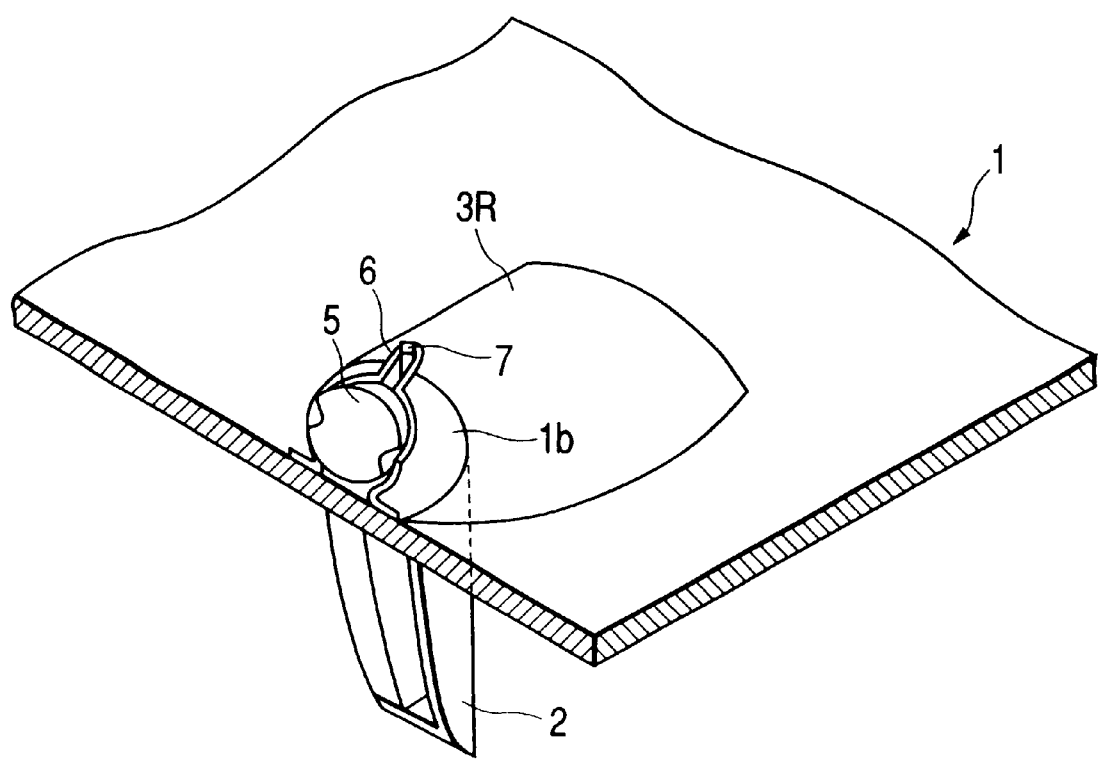
FIG. 7 is a perspective view for showing an inner side of the main body.
Figure 8:
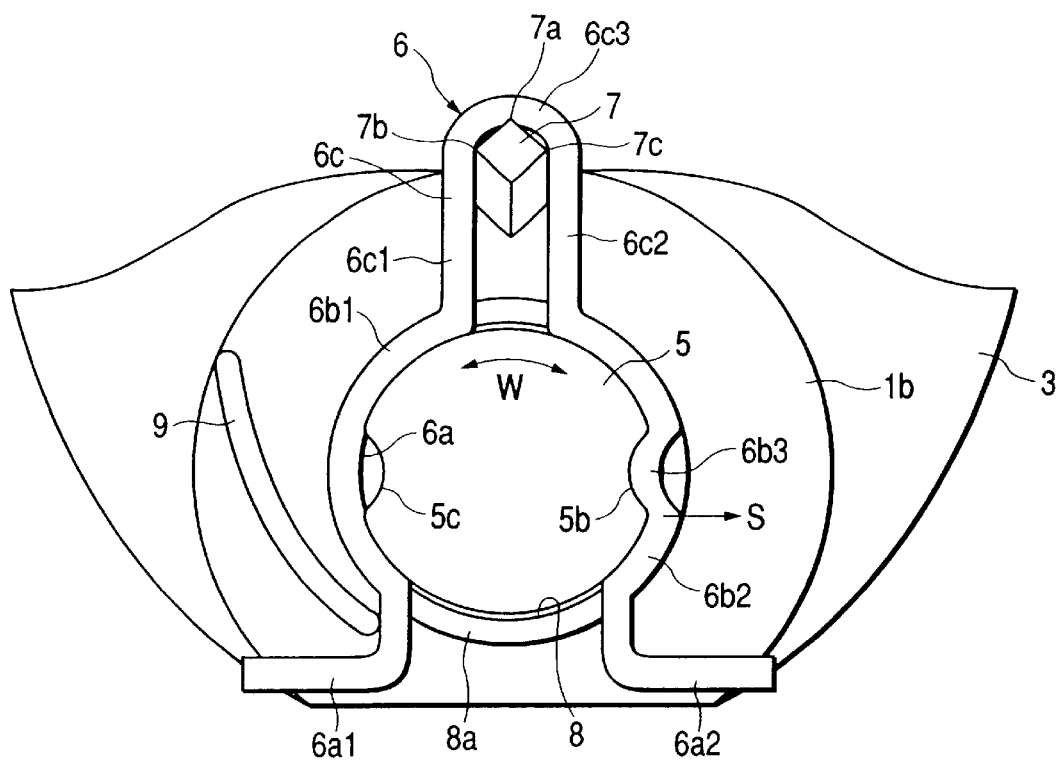
FIG. 8 is a top plan for showing a locked state of locking means.
Figure 9:
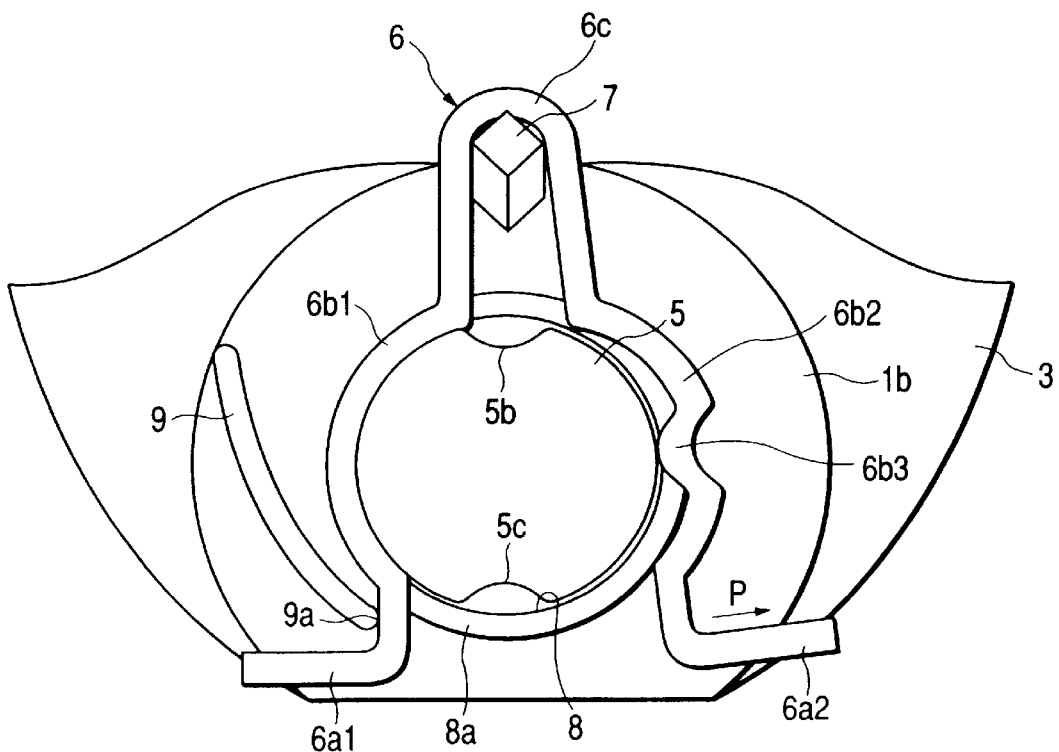
FIG. 9 is a top plan view for showing a state in which the locking means is in the middle of locking operation.
Figure 10:
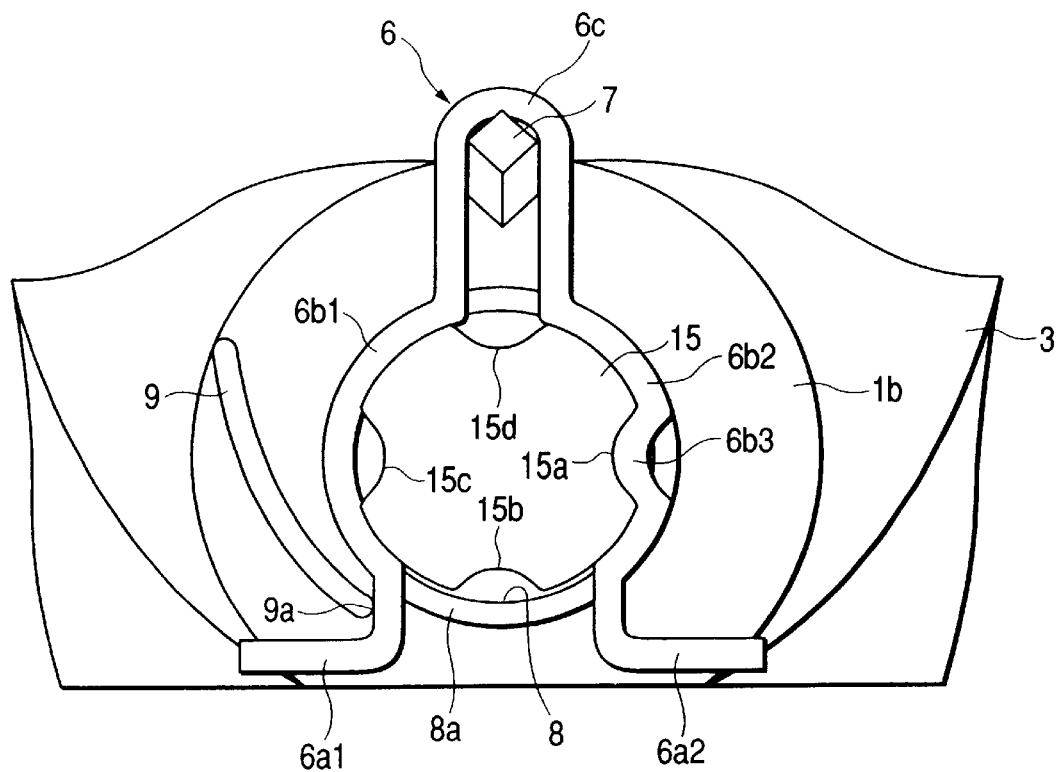
FIG. 10 is a top plan view for showing other locking means.
Figure 11:
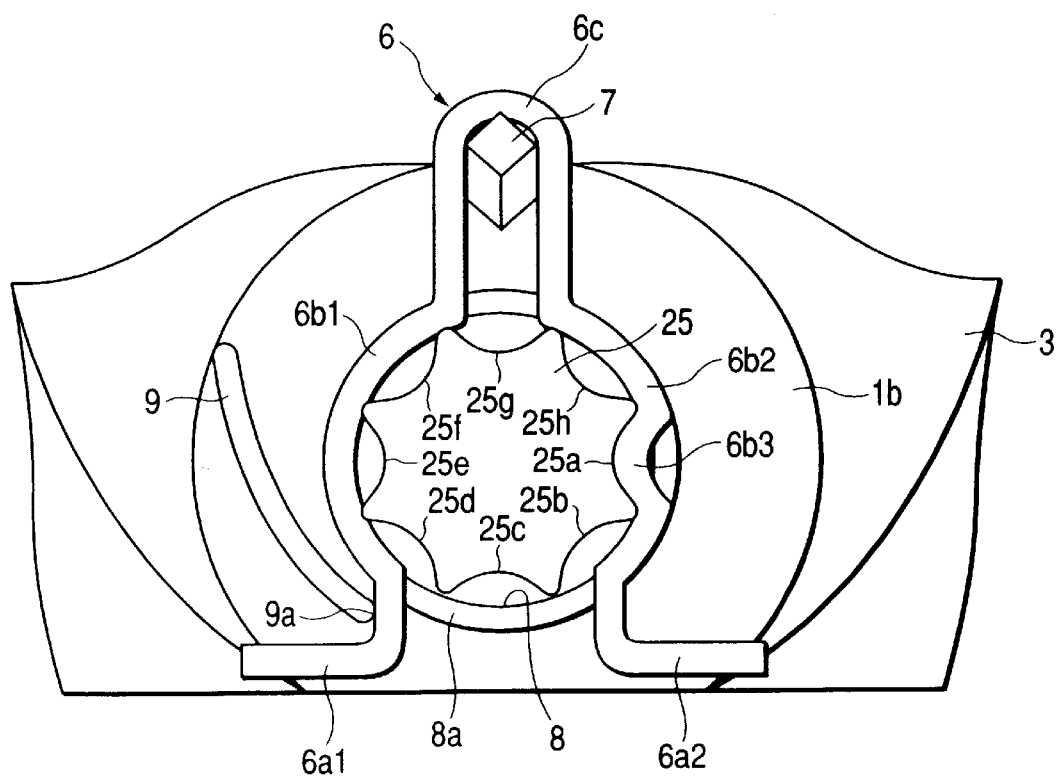
FIG. 11 is a top plan view for showing still other locking means.
Figure 12:
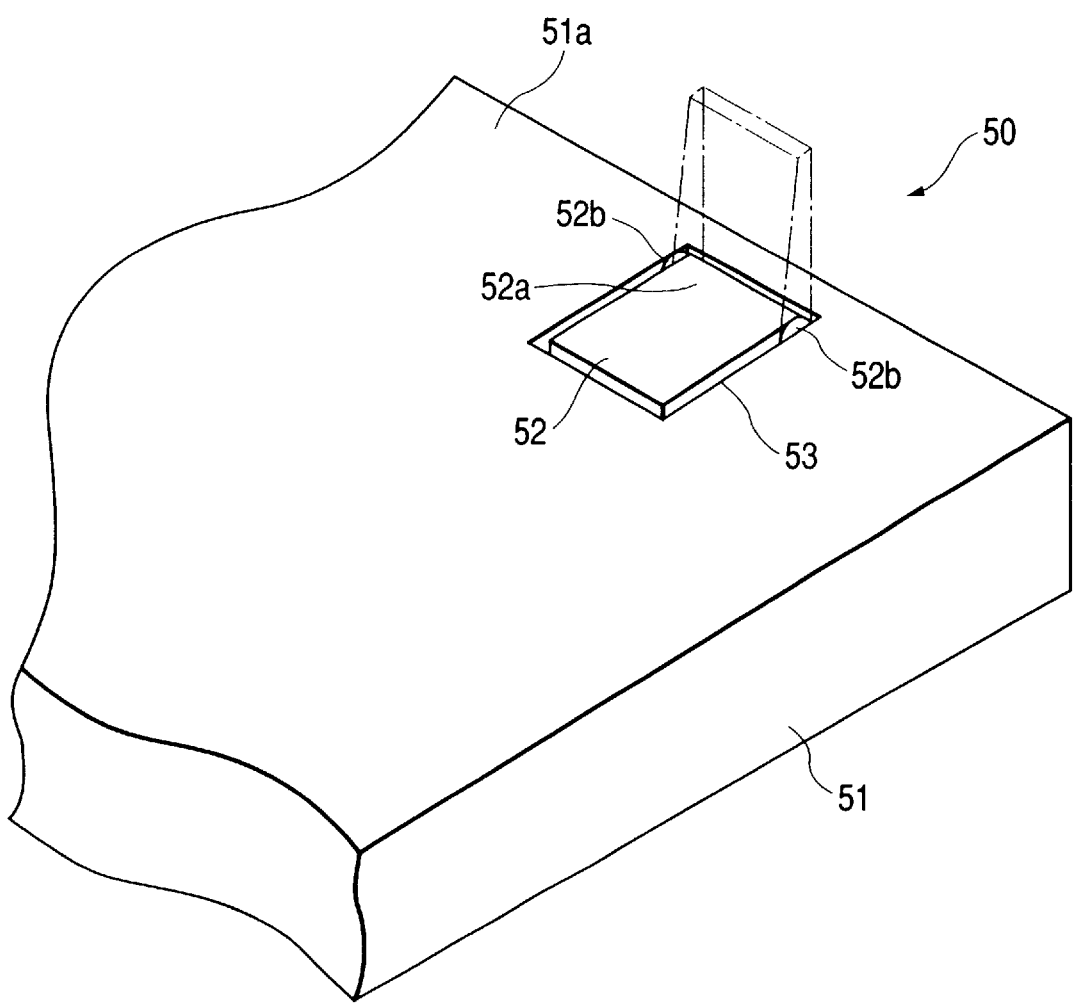
FIG. 12 is a perspective view for showing the prior art keyboard device.

FIG. 1 is a perspective view for showing a state of use of the keyboard device of the present invention; FIG. 2 is a perspective view for showing an adjuster member and its action; FIG. 3 is a top plan view for showing a storing attitude of the adjuster member; FIG. 4 is a top plan view for showing a protruding attitude of the adjuster member; FIG. 5 is a sectional view taken along line 5—5 of FIG. 3; FIG. 6 is a sectional view taken along line 6—6 of FIG. 3; FIG. 7 is a perspective view for showing an inner side of the main body; FIG. 8 is a top plan for showing a locked state of locking means; FIG. 9 is a top plan view for showing a state in which the locking means is in the middle of locking operation; FIG. 10 is a top plan view for showing other locking means; FIG. 11 is a top plan view for showing still other locking means; and FIG. 12 is a perspective view for showing the prior art keyboard device, respectively.

As shown in FIG. 1, a main body 1 and adjuster members 2, 2 constitute the keyboard device 10 of the present invention. The main body 1 is entirely made of resin, and the surface of the main body 1 is provided with operation keys 11 comprised of a plurality of keys arranged under a predetermined standard. Each of the adjuster members 2, 2 is arranged at both ends of the rear surface of the main body 1, the adjuster member is turned in a direction P as viewed in the figure, thereby the adjuster member 2 can be stored in the main body 1 or protruded out of the main body 1 to enable the main body 1 to be moved up and down in the height direction Q. With the above arrangement, an inclination angle of the main body 1 (operation keys 11) is changed. The keyboard device 10 is normally mounted on a horizontal surface such as a desk top 12, for example, and its key operation is carried out.

As shown in FIG. 2, the rear surface 1a of the main body 1 is formed with a notch 3 having a curved surface, and an adjuster member 2 is arranged in the notch 3. This adjuster member 2 can be stored in the notch 3. In addition, this adjuster member 2 is formed to be smaller than a volume of the notch 3. When the adjuster member 2 is stored in the notch 3, clearances 3a, 3a are formed at both sides of the adjuster member 2.

As shown in FIGS. 3 and 4, the adjuster member 2 is turned around a turning centerline O. The turning centerline O has an inclined angle in respect to the rear surface 1a. One end side of the adjuster member 2 in its longitudinal direction is pivotally supported at the main body 1 and the other end side of the adjuster member 2 is a protruding end protruded out of the notch 3 when it is turned.

The notch 3 is formed such that a depth size from the rear surface 1a is large at the portion where the supporting side of the adjuster member 2 is pivotally supported and a depth size from the rear surface 1a becomes smaller as it is spaced away from the portion where it is pivotally supported.

The inner surface shape of the notch 3 is a concave curved surface including arcs with a plurality of locations in the turning centerline O being applied as centers. That is, a sectional surface of the notch 3 shown in FIG. 5 is a concave curved surface 5A where it is taken at a portion having a small depth size. A sectional surface of the notch 3 shown in FIG. 6 is a concave curved surface 6A where it is taken at a portion having a large depth size. In this way, the notch 3 has a continuous shape while a shape composed of a concave curved surface is being held from the supporting side of the adjuster member 2 toward the protruding end.

In addition, the turning support side of the notch 3 is formed with a circular bearing hole 8. The bearing hole 8 is made such that the turning centerline O is applied as a center and a cylindrical protruding portion 8a protruding inwardly of the main body 1 is integrally formed with a circumferential edge of the bearing hole 8.

As shown in FIG. 2, the opening part of the notch 3 has a shape in which it is formed with a parabolic line L1 extending from the supporting side to the protruding end and the extremity ends of the line L1 are connected with a curved line L2.

In turn, a thickness size of the adjuster member 2 is made thick at the supporting side and thin as it is directed toward the protruding end. As shown in FIGS. 5 and 6, the adjuster member 2 has a shape in which its sectional surface is shaped like a mountain, each of the extremity ends 2b, 2c and 2d of the mountain-shape is formed to be near up to a degree at which it is abutted against the inner surface of the notch 3, and when the adjuster member 2 is turned, it may slide against the notch 3 with little clearance.

Additionally, the side of the adjuster member 2 opposite to the side facing against the inner surface of the notch 3 is formed by a flat surface 2a positioned on the substantial same plane as that of the rear surface 1a when the adjuster member 2 is stored in the notch 3. If the flat surface 2a is positioned on the substantially same plane as that of the rear surface 1a, it may not be limited to one having a flat surface.

Further, a column-like shaft 5 is integrally formed at the supporting side of the adjuster member 2, and the center of the shaft 5 is coincided with the turning centerline O. The outer circumference of the shaft 5 is formed with a sliding notch 5a. The sliding notch 5a is formed at a position where the shaft 5 is exposed out of the protruding portion 8a when the shaft 5 is inserted into the bearing hole 8.

Further, it is not necessary that the adjuster member 2 has a mountain-shaped sectional surface as described above and a notch portion is formed, and the entire unit is formed by resin without forming any notch portion. In addition, the entire adjuster member 2 may be formed of a metallic material, or a rubber member may be arranged at a contact portion with the mounting surface for use in preventing its slippage.

As shown in FIG. 7, a bulged portion 3R of the notch 3 appears at the rear side of the notch 3, the pivoting support side of the notch 3 is formed with a circular portion 1b around the bearing hole 8, and the shaft 5 of the adjuster member 2 is projected out of the bearing hole 8. Further, the shaft 5 is provided with the resilient member 6 capable of resiliently pressing the outer circumference of the shaft 5.

Further, the flat surface 1b is formed with a position-setting member 7 for setting position of the resilient member 6. The position-setting member 7 is comprised of a rod-like member having a parallelepiped shape in section and it is formed to protrude against the rear surface 1a in a direction substantially crossed with it. Although a shape of the position setting member 7, shown in a sectional shape taken along a plane in parallel with the rear surface 1a, is a square, it is not limited to this shape, and the rod members having, as their cross-sectional shape, a cross-shape, a triangle and a polygon or the like may also be applied.

Folding a metallic fine wire makes the resilient member 6. That is, as shown in FIG. 8, the resilient member 6 is entirely formed in an inverse Vshape, wherein each of both extremity ends has L-shaped footings 6a1, 6a2 bent outwardly, respectively. The base end is formed with a U-shaped bent portion 6c, and each of the bent portions 6b1 and 6b2 is formed between the extremity end and the base end. In addition, the curved portions 6b1, 6b2 are formed along the curved surfaces of the outer circumference of the shaft 5.

Further, a protrusion 9 is formed near the resilient member 6, i.e. on the flat surface 1b. One end of the protrusion 9 is abutted from outside near the footing 6a1.

Although the outer circumference of the shaft 5 is resiliently pressed by the resilient member 6, the sliding notch 5a formed at the outer circumference of the shaft 5 is turned while being slid with the curved portions 6b1, 6b2. The shaft 5 slides in the bearing hole 8 with little clearance and the curved portions 6b1, 6b2 are abutted against the protruding portion 8a of the bearing hole 8, thereby the shaft 5 is prevented from being pulled out of the bearing hole 8.

Further, the footings 6a1, 6a2 are abutted against the back surface 1c of the main body 1 (refer to FIG. 3), a position setting member 7 is inserted into the bent-back portion 6c, and the corner portions 7a, 7b and 7c are abutted against the inner surface of the bent portion 6c. With the above arrangement, the resilient member 6 is held positively in the main body 1, and the resilient member 6 is prevented from being rotated together when the shaft 5 is turned.

In addition, the aforesaid keyboard 10 is provided with lock means for locking the adjuster member 2 at a predetermined position.

The lock means shown in FIG. 8 enables the main body 1 and the adjuster member 2 to be locked under a state in which the protruding end of the adjuster member 2 is projected out of the rear surface 1a and further enables the main body 1 and the adjuster member 2 to be locked under a state in which the adjuster member 2 is stored in the notch 3.

That is, the outer circumferential surface of the shaft 5 is formed with the engaging notches 5b, 5c opposing against with each other while the turning center of the shaft 5 is being held therebetween. In turn, an engaging protrusion 6b3, which can be engaged with the engaging notches 5b, 5c, is bent and formed at the curved portion 6b2 of the resilient member 6.

Then, operation of the keyboard device 10 will be described.

In the case where the adjuster member 2 is not used, the adjuster member 2 is stored in the notch 3 of the main body 1, thereby the inclination angle against the plane where the main body 1 is mounted can be set to a minimum value and in turn in the case where the adjuster member 2 is used, the adjuster member 2 is protruded out of the notch 3 of the main body 1, thereby the inclination angle against the plane where the main body 1 is mounted can be set to a maximum value.

In addition, as shown in FIG. 8, the engaging notch 5b of the shaft 5 and the engaging protrusion 6b3 of the resilient member 6 are engaged to each other to cause the adjuster member 2 to be locked. This state is defined as an attitude in which the adjuster member 2 is stored completely in the notch 3. As shown in FIG. 3, the adjuster member 2 is held under a state in which the flat surface portion 2a of the adjuster member 2 and the rear surface 1a of the main body 1 are substantially on the same plane.

When the adjuster member 2 is turned from this state to be protruded out of the notch 3, the shaft 5 is turned around the turning centerline O toward the direction of arrow W. At this time, the concave curved surface of the adjuster member 2 slides against the inner surface of the notch 3 without any clearance.

As the shaft 5 is turned, the fitted state between the engaging notch 5b and the engaging protrusion 6b3 is released, the engaging protrusion 6b3 is resiliently deformed in a direction 5 against the resilient force of the resilient member 6, and the engaging protrusion 6b3 slides while it is being abutted against the part except the engaging notches 5b, 5c. With the above arrangement, as shown in FIG. 9, only one side of the resilient member 6 is opened. At this time, the footing 6a1, bent part 6b1 and one of the bent-back portions 6c of the resilient member 6 are engaged by the protruding portion 9 in such a way that the resilient member 6 is not opened. The protruding portion 9 is formed as described above, with the result that both footings 6a1, 6a2 of the resilient member 6 are prevented from being resiliently deformed to cause their legs to be opened and the adjuster member 2 is prevented from being dropped out of the main body 1.

Further, when the shaft 5 is turned from the engaged position between the engaging protrusion 6b3 and the engaging notch 5b by 180, the resilient member 6 is resiliently returned back and the engaging protrusion 6b3 is engaged with the engaging notch 5c. With the above arrangement, the adjuster member 2 is locked while keeping the attitude in which it is protruded against the notch 3. As a result, the adjuster member 2 is set at the attitude shown in FIG. 4 and the inclination angle of the main body 1 is set to the maximum value.

Further, in the keyboard device 10 of the present invention, the shaft can be changed to the shape shown in FIG. 10 and the inclination angle of the main body 1 can be set in multi-stage. In addition, in the shaft 15 shown in FIG. 10, the engaging notch is merely increased in regard to the shaft 5 and other shapes or the like are exactly the same as above.

That is, the shaft 15 is formed with notches 15a, 15b, 15c, 15d at its outer circumferential portion, wherein in FIG. 10, the engaging protrusion 6b3 is engaged with the engaging notch 15a. If it is assumed that the state shown in FIG. 10 corresponds to a state in which the adjuster member 2 is stored completely in the notch 3 and the inclination angle of the main body 1 is set to the minimum value, when the shaft 15 is turned to cause the engaging protrusion 6b3 of the resilient member 6 to be engaged with the engaging notch 15c formed at the position opposing against the engaging notch 15a, the adjuster member 2 shows the maximum amount of protrusion from the notch 3 and the inclination angle of the main body 1 is set to the maximum value. Further, in the case where the engaging protrusion 6b3 is engaged with either the engaging notch 15b or 15d, the main body 1 is set to the inclination angle near an intermediate value between the aforesaid minimum inclination angle and the aforesaid maximum inclination angle.

In the keyboard device 10 of the present invention, it is also satisfactory that the shaft 25 shown in FIG. 11 is arranged at the adjuster member 2. Also in this case, the portion other than the shaft 25 is formed in the same manner as described above. The shaft 25 is provided with engaging notches 15a to 15h that can be engaged with further many engaging protrusions 6b3 than those of the shaft 15. If it is assumed that the adjuster member 2 is stored completely in the notch 3 and the inclination angle of the main body 1 is set to the minimum value under a state in which the engaging protrusion 6b3 shown in FIG. 11 is engaged with the engaging notch 15a, and when the shaft 25 is turned from the aforesaid state to cause the engaging protrusion 6b3 to be engaged with the engaging notch 25e, the adjuster member 2 shows the maximum amount of protrusion from the notch 3 and the inclination angle of the main body 1 is set to the maximum value. Further, when the engaging protrusion 6b3 is engaged with the engaging notch 25c (or 25g), the inclination angle between the maximum one and the minimum one is set against the adjuster member 2. Further, when the engaging protrusion 6b3 is engaged with the engaging notch 25b (or 25h), the intermediate inclination angle when the engaging protrusion 6b3 is engaged with the engaging notches 25a, 25c (or 25a and 25g) is set against the main body 1. In addition, when the engaging protrusion 6b3 is engaged with the engaging notch 25d (or 25f), the intermediate inclination angle when the engaging protrusion 6b3 is engaged with the engaging notches 25e, 25c (or 25e and 25g is set against the main body 1.

In the case of the keyboard device 10 shown in FIGS. 10 and 11, since it is necessary that the adjuster member 2 is locked at the inclination angle except the minimum inclination angle and the maximum inclination angle, it is preferable that a resilient force of the resilient member 6 is set to a degree at which even if it is locked at an intermediate inclination angle, the engaged state between the engaging protrusion 6b3 and each of the engaging notches 15b, 15d, 25b to 25d, 25f to 25h is released, it is turned in a key operation and no trouble is produced for the key inputting operation.

As shown in FIGS. 10 and 11, the inclination angle of the main body 1 can be set in a multi-stage manner, thereby each of the protruding attitude of one adjuster member 2 of the two adjuster members arranged at the rear surface 1a of the main body 1 and the other protruding attitude of the other adjuster member 2 can be held at a different attitude independently.

The keyboard device of the present invention is not limited to the aforesaid preferred embodiments and it is also applicable that a shape of the outer circumference of the shaft is set to a shape of a gear or a similar shape, the engaging protrusion of the resilient member is also engaged with the gear and a finer inclination angle than that of the keyboard device shown in FIG. 11 is set.

In addition, if the storing attitude into the notch and the protruding attitude can be set under a turning operation with the turning centerline O being applied as a reference, the inclination angle of the turning centerline O against the rear surface 1a as well as the shape of the adjuster member 2 and the shape of the notch 3 are not limited to those as illustrated, and they may be properly changed.

In addition, the resilient member 6 is not limited to the metallic member, but if the resilient member can be resiliently pressed to a degree at which the adjuster member 2 is not turned during the key inputting operation and further it can be resiliently deformed, a resilient member formed by synthetic resin is also applicable.

Further, the number of mounting locations of the adjuster member is not limited to two, and it is satisfactory that four mounting locations are set at four corners of the rear surface 1*a*, for example.

As described above, in the present invention, one attitude in which the adjuster member is stored in the notch under turning of the shaft and the other attitude in which the adjuster member is protruded out of the notch can be changed over fast even if the shaft arranged in the adjuster is pivotally supported only at one position the main body. Thus, bringing the fingers to the rear surface side of the keyboard device and raising up the adjuster member may easily be carried out. In addition, the state in which the adjuster member is protruded becomes stable.

In addition, even if the mounting surface of the main body is not necessarily flat, for example, even if it is required to mount it on the inclined surface, each of the adjuster members is set to an independent inclined attitude, thereby it is possible to keep the surface of the operation keys arranged at the main body in a horizontal state, and it becomes possible to perform the positive key inputting operation without any looseness under a similar operating touch to the case where the main body is mounted on the horizontal surface.

Further, mere engagement between the resilient member and the adjuster member enables the adjuster member to be pivotally supported and then the adjuster member is prevented from being dropped out of the main body.

In addition, clearances are formed at both sides of the adjuster member when the adjuster member is stored, thereby insertion of the fingers into the clearances and mere turning toward a predetermined direction enables the inclination angle of the main body to be changed.

What is claimed is:

1. A keyboard device in which an adjuster member arranged at a rear surface of a main body having operation keys at a front surface and installed to be freely protruded from the rear surface is installed and a mounting attitude of the main body is set to a predetermined angle when said adjuster member is protruded, wherein the rear surface of the main body is formed with a notch;

the adjuster member is rotatably supported in the notch;

the adjuster member can be turned between one attitude in which the adjuster member is stored in the notch and another attitude in which the adjuster member is protruded out of the rear surface, a turning centerline of the adjuster member is extended from within the notch toward an opening side of the notch at an angle inclined against the rear surface of the main body, one end of the adjuster member in a longitudinal direction of the adjuster member is a supporting side rotatably supported and an other end of the adjuster member in the longitudinal direction is a protruding end protruded out of the notch when the adjuster member is turned, and the turning centerline of a turning operation is positioned at the one end side and crossed with a direction extending from the one end to the other end.

2. A keyboard device according to claim 1, wherein the notch is made to have a large depth size measured from the rear surface at a portion where the supporting side of the adjuster member is rotatably supported and the depth size is made to be small as the supporting side is spaced apart from the portion where the supporting side is rotatably supported; and a thickness size of the adjuster member in a direction to which the turning centerline extends shows a thick size at the supporting side and shows a thin size as the adjuster member is directed toward the protruding end.

3. A keyboard device according to claim 1, wherein an inner surface of the notch is a concave curved surface including arcs with a plurality of locations on the turning centerline being applied as centers;

a side of the adjuster member opposing against the inner surface of the notch is of a shape in which the side opposing against an inner side of the notch is slid on the concave curved surface with little clearance during the turning operation, and when the adjuster member is stored in the notch, the side of the adjuster member opposite to the opposing side is of a surface shape where the side opposing against the inner side of the notch is positioned on the substantially same location as that of the rear surface.

4. A keyboard device according to claim 1, wherein there is provided a lock that locks the main body and the adjuster member under a state in which the protruding end is protruded out of the rear surface.

5. A keyboard device according to claim 4, wherein the adjuster member is provided with a shaft, bearing holes through which the shaft passes are opened in the notch, the main body is provided with a resilient member for resiliently pressing itself against an outer circumference of the shaft under a state in which the shaft is inserted into the bearing holes, and the shaft and the resilient member are fitted to each other to form the lock.

6. A keyboard device according to claim 5, wherein the resilient member resiliently presses the shaft passed through the bearing holes and the resilient member prevents the shaft from being pulled out of the bearing holes.

7. A keyboard device according to claim 1, wherein there is provided a lock means that locks the main body and the adjuster member under a state in which the adjuster member is stored in the notch.

8. A keyboard device according to claim 1, wherein there is provided a lock that locks the main body and the adjuster member under a state in which the protruding end is protruded out of the rear surface at a maximum angle, a state in which the adjuster member is stored in the notch, and at least one state in which the protruding end is protruded out of the rear surface at an intermediate angle less than the maximum angle.

9. A keyboard device according to claim 1, wherein the adjuster members are arranged at at least two locations in the rear surface of the main body.

\* \* \* \* \*